United States Patent [19]

Orain

[11] Patent Number: 4,518,370
[45] Date of Patent: May 21, 1985

[54] TRANSMISSION FOR A MOTOR VEHICLE

[75] Inventor: Michel A. Orain, Conflans Sainte Honorine, France

[73] Assignee: Glaenzer Spicer, Poissy, France

[21] Appl. No.: 497,011

[22] Filed: May 23, 1983

[30] Foreign Application Priority Data

May 26, 1982 [FR] France .............................. 82 09152

[51] Int. Cl.³ .......................... F16D 3/22; F16C 3/00
[52] U.S. Cl. .................................. 464/113; 180/70.1; 464/183
[58] Field of Search .............................. 464/113–119, 464/140, 180, 183; 180/70.1, 73, 74, 254

[56] References Cited

U.S. PATENT DOCUMENTS 4,282,949 8/1981 Kopich et al.
4,392,839 7/1983 Aucktor .............................. 464/183

FOREIGN PATENT DOCUMENTS 2135909 11/1977 Fed. Rep. of Germany ..... 180/70.1
2851293 5/1979 Fed. Rep. of Germany ..... 180/70.1
2416811 2/1978 France.
2424143 4/1978 France.
880117 10/1961 United Kingdom.

Primary Examiner—Stuart S. Levy
Assistant Examiner—Thomas R. Hannon
Attorney, Agent, or Firm—Wenderoth, Lind & Ponack

[57] ABSTRACT

A unit comprising a transmission shaft and elements of constant-speed joints connected to such shaft has a moment of inertia $I_G$ about an axis perpendicular to the transmission shaft and passing through the center of gravity of the unit which is defined by the relation $I_G = m \cdot h \cdot l$, in which m is the mass of the unit and h and l are the distances between the articulation centers of the two joints and the center of gravity. This arrangement prevents radial vibrations of a driving shaft in the region of the joint to be connected to a wheel.

8 Claims, 5 Drawing Figures

TRANSMISSION FOR A MOTOR VEHICLE

BACKGROUND OF THE INVENTION

The present invention relates to a transmission for a motor vehicle, of the type comprising a transmission shaft connected to a driving shaft and to a driven shaft by respective constant-speed joints.

The transmission shafts employed in motor vehicles for transmitting power from the drive unit to a driving wheels are provided with constant-speed articulated joints. Some of these joints permit a very free sliding and thus cut off the axial vibrations produced by the drive unit, i.e. prevent such vibrations from reaching the wheels.

But it is known that no constant-speed joint provided for transmission shafts of motor vehicles permits stopping the propagation of radial vibrations of the driving shaft from the drive unit to the wheels and to the structure of the vehicle. This is due to the fact that all these joints are of a mechanical construction which is radially rigid and the filtering of the radial vibrations would require a radial elasticity which is incompatible with the transmission of high torque a small volume, i.e. by a small unit.

French Pat. No. 78 03 978 proposes a device comprising two joints having a very low friction and a support bearing for the transmission shaft, this device constituting an effective dynamic break in the radial vibrations for all radial vibration frequencies produced by the drive unit.

However, in the case of a lateral transmission of a front wheel drive vehicle, the available space is often so small that the use of such a device becomes a problem.

SUMMARY OF THE INVENTION

An object of the present invention is therefore to provide an arrangement producing the same advantages but of a simplified construction and of small size so as to allow an easy placement thereof in all front wheel drive vehicles. However, one skilled in the art will understand that the invention may also be applied to longitudinal and lateral transmissions of rear wheel drive vehicles.

The invention therefore provides a transmission of the aforementioned type, wherein the unit formed by the transmission shaft and the component elements of the constant-speed joints connected to this shaft has a moment of inertia $I_G$ about an axis perpendicular to the transmission shaft and passing through the center of gravity G of the unit which is defined at least roughly by the equation $I_G = m \cdot h \cdot l$, where m is the mass of the unit and h and l are the distances between the centers of articulation of the two joints and the center of gravity G.

If at least one constant-speed joint comprises intermediate elements between the part thereof carried by the transmission shaft and the part thereof carried by the corresponding driving or driven shaft, the filtration of the radial vibrations of the driving shaft is particularly effective when the moment of inertia $I_G$ involves half the moment that these intermediate elements would have relative to the axis if they were fixed to the transmission shaft.

BRIEF DESCRIPTION OF THE DRAWINGS

The invention is described hereinafter in more detail with reference to the accompanying drawings which show various embodiments. In the drawings.

DETAILED DESCRIPTION OF THE INVENTION

Figure 1:
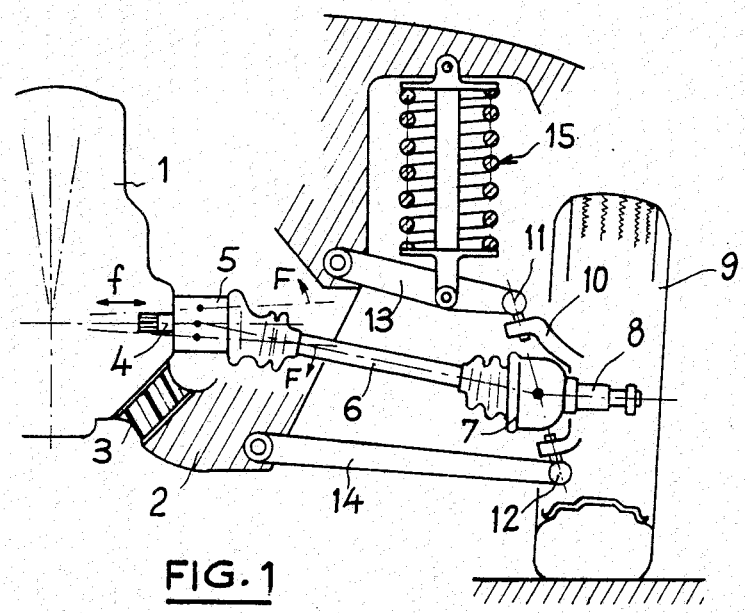
FIG. 1 is a diagrammatic view of a lateral transmission according to the invention.

FIG. 1 shows a motor drive unit 1 carried by the chassis 2 of a front wheel drive vehicle by means of elastically yieldable blocks 3. On each side of the unit 1 there extends transversely an output shaft 4 of a differential connected by an articulated constant-speed joint 5 to a transmission shaft 6. The latter is connected by an articulated constant-speed joint 7 to a wheel stub-axle 8 which drives a steering wheel 9. The stub-axle 8 is journalled in a wheel pivot 10 which is pivotally mounted by an upper ball joint 11 and lower ball joint 12 on the outer end of two respective suspension arms 13 and 14, the inner ends of which are pivotally mounted on the chassis 2. Interposed between the upper arm 13 and the chassis 2 is a suspension and damping device 15. The joint 5 is a joint of the "sliding" type, ie. a telescopic joint, and the joint 7 is a "fixed" joint, ie. a joint which is axially retained, allowing a large break angle.

Figure 2:
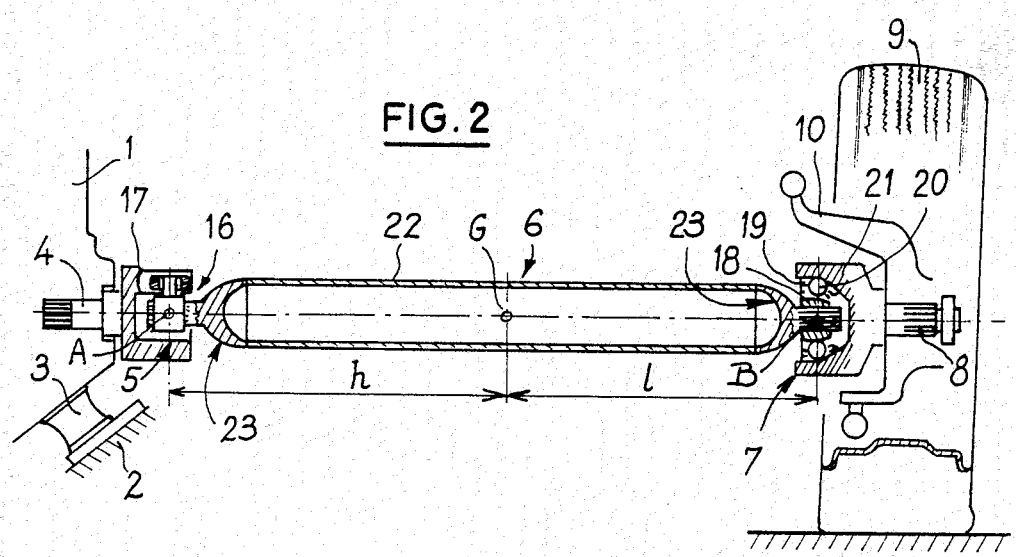
FIG. 2 is partial diagrammatic sectional view of this transmission.

As can be seen in FIG. 2, the joint 5 may be a joint of the slidable tripod type comprising a tripod element 16 and a tulip element 17, and the joint 7 may be a joint of the Rzeppa type comprising an inner block 18 and an outer block 19, a series of balls 20 retained in a cage and a bowl element 21.

In the embodiment shown in FIG. 2, the shaft 6 comprises a tube 22 provided at each end with a Y-sectional end member 23. This end member is formed by a cup 24 from the bottom of which extends a splined shaft portion 25. The edge of the cup 24 is secured to the corresponding end of the tube 22.

Figure 3:
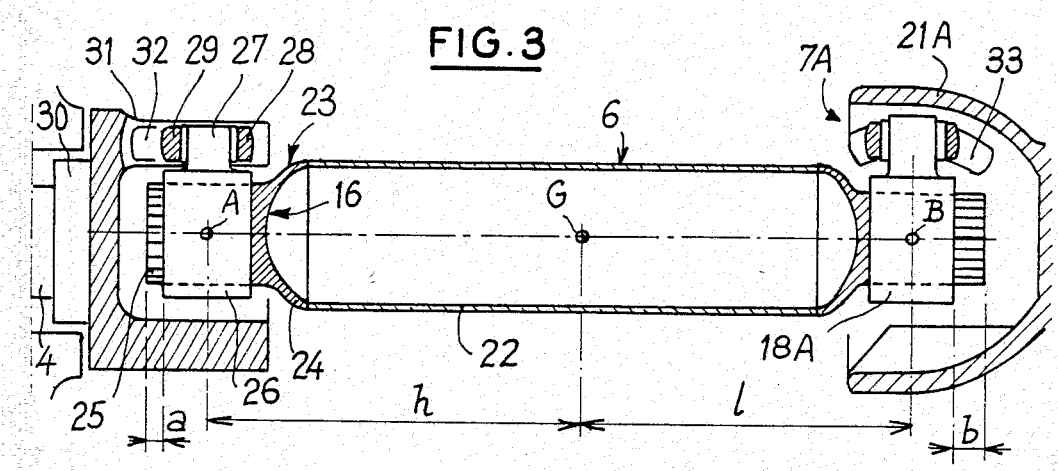
FIG. 3 is a similar view of a modification.

The tripod element 16, which is seen better in FIG. 3, comprises a hub 26 from which radially extend three arms 27 spaced 120° apart. Journalled and slidable on each arm 27 is an externally variable roller 28 by means of a needle bearing 29. The tulip element 17 comprises a body 30 fixed to the shaft 4 and three petal portions 31 extending in an axial direction. Between the petal portions 31 are formed three pairs of tracks 32, each roller 28 being received in one of these pairs. The hub 26 is internally splined so as to cooperate with the corresponding shaft end portion 25 and its axial position on this shaft end portion is fixed by circlips (not shown).

Likewise, the inner block 18 of the joint 7 is internally splined and secured in axial position on the other shaft end portion 25 and the outer block 19 is rigid with the bowl element 21 fixed to the stub axle 8.

The axial vibrations (FIG. 1, arrow f) of the driving shaft 4 are effectively filtered by the very free sliding of the tripod joint 5 and are not transmitted to the shaft 6. On the other hand, in conventional arrangements, the radial high-frequency vibrations coming from the motor drive unit 1, in the direction of arrows F of FIG.

1, are transmitted dynamically owing to the mass and the stiffness of the shaft 6, from the constant-speed joint 5 to the constant-speed joint 7 of the wheel and travel through the stub-axle 8, the pivot 10 and the arms 13 and 14, to the chassis 2. Further, a part of the vibrations may rise up the steering column (not shown) to the steering wheel (not shown).

Now, according to the present invention, means are provided for preventing the radial vibrations from reaching the wheel stub-axle 8. These means are provided by the fact that the unit comprising the shaft 6 and the component parts it carries have a moment of inertia $I_G$ about an axis perpendicular to the shaft 6 and passing through the center of gravity G of the unit which satisfies the equation:

$$I_G = m \cdot h \cdot l \quad (1)$$

in which m is the mass of this unit and h and l are the distances between the centers A and B of articulations of the joints 5 and 7 and the center of gravity G.

The component parts involved in the mass m to be considered for the calculation of $I_G$ are:
the tube 22;
the connection end members 23;
the tripod element 16 provided with its rollers 28 considered to be fixed relative to the shaft 6, and
the inner block 18 and balls 20 and their cage, of the Rzeppa joint 7.

As concerns the balls 20 and the cage of the Rzeppa joint 7 which travel at an angle equal to one half the angle of the joint, there may be taken into account in the calculation of $I_G$ half the moment of inertia that they would have if they were fixed relative to the shaft 6.

In practice, in the general case, the values of h and l are calculated to the first approximation and determined with precision by bench test by slightly shifting the tripod element 16 and the block 18 until a complete break is achieved in the vibrations in the region of the joint 7. This provides precision in placement of the circlip grooves to be formed on the shaft end portions 25 for fixing the axial position of the tripod element 16 and the block 18.

Indeed, owing to the foregoing equation, the radial vibrations produced at the center of one of the two joints are cancelled out at the center of the other joint. In this way there is obtained a dynamic break in the radial vibrations of the driving shaft 4 in the region of the fixed joint 7 and, inversely, the radial vibrations concerning the jumping of the wheel, for example on paving stones, are not transmitted to the drive unit.

The modification shown in FIG. 3 differs from the foregoing in the Rzeppa joint 7 is replaced by a joint 7A of the type having an axially fixed tripod element. This joint 7A comprises a tripod element 18A having rollers mounted on needles similar to the tripod element 16, and a bowl or tulip element 21A secured to the stub-axle 8. Each roller is received between two tracks 33 having curved center lines through. The hub of the tripod element 18A is internally splined and may be fixed in a given axial position on the corresponding shaft end portion 25 by circlips (not shown).

The relation $I_G = m \cdot h \cdot l$ is still substantially satisfied, m here designating the mass of the shaft 6 and of the two tripod elements 16 and 18A provided with their rollers.

However, when the shaft 6 is short, owing to the effect of the inertia of the rollers about their own axis of rotation, this formula no longer constitutes a sufficient approximation. Thus, in the case of transmissions provided with two tripod joints, the tripod elements of which are rigid with the intermediate shaft, if:

$I_G$ = inertia of the assembly comprising the transmission shaft, the tripod elements and the rollers about an axis perpendicular to shaft 6 and passing through the center of gravity G;

m = mass of this assembly;

J = moment of inertia of a roller about its axis of rotation;

r = distance between the center of a roller and the axis of transmission, and

R = rolling radius of a roller or spherical radius of the roller, the dynamic break in the radial vibrations is achieved when the following relation is satisfied:

$$h \cdot l = \frac{I_G + 3J\left(\frac{r}{R}\right)^2}{m} \quad (2)$$

This arrangement, which takes into account the inertia of the rollers about their axis of rotation, makes it possible to obtain a complete break in the vibrations without taking prior experimental measures. It may be observed that it results in a distance between the tripod elements which is larger than the simplified formula $I_G = m \cdot h \cdot l$ which is moreover found if $J = 0$.

The arrangements shown in FIGS. 2 and 3 make it possible to obtain the indicated relation inexpensively since the cavity of the cups 24 of the end member 22 space the centers of gravity of these end members sufficiently away from the point G. This is made possible by the manner in which the inner elements 16, 18, 18A of the two joints are mounted on the shaft end portions 25, it being possible to arrange if necessary that the latter extend outwardly beyond these elements suitable distances a and b (FIG. 3).

Further, in order to satisfy the relation $I_G = m \cdot h \cdot l$, it is in practice necessary to have the connecting tube 22 as light as possible while retaining high rigidity in flexion so as to avoid entering into resonance with the radial vibration frequencies produced by the motor and a sufficient resistance in torsion so as to provide a normal guarantee of performance at peak values due to driving faults, for example when violent clutching occurs. The connecting tube 22 may be for example of high-strength thin steel or of any other light and sufficiently rigid and strong material which permits, after the fixing of the end members 23 and assembly with the inner component elements of the joints, achieving the aforementioned condition.

For example, with respect to a touring vehicle of medium power, the steel tube may have a thickness of 1 mm and an outside diameter of 40 mm. It may be either welded to the edges of the end members 23 by electronic bombardment or laser or merely brazed or resistance welded or secured by any other known means.

Figure 4:
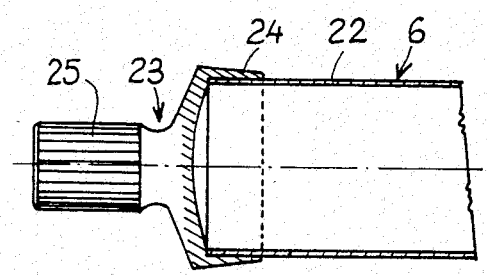
FIG. 4 is a view to an enlarged scale of a detail of a transmission of the same type.

FIG. 4 shows an example of the fixing of a thin strong tube 22 inside an end member 23. The tube is fitted in a symmetrical entrance portion of the cup 24 and abuts against a shoulder in the latter. The connection between the two contacting cylindrical surfaces is ensured by adhesion, brazing or any other known means.

Note that in certain applications, it may be advantageous to fix at least one of the end shaft portions 25 not to the inner element of the adjacent constant-speed joint but to another element of this joint and in particular to the bowl element constituting the outer element of a tripod joint.

Figure 5:
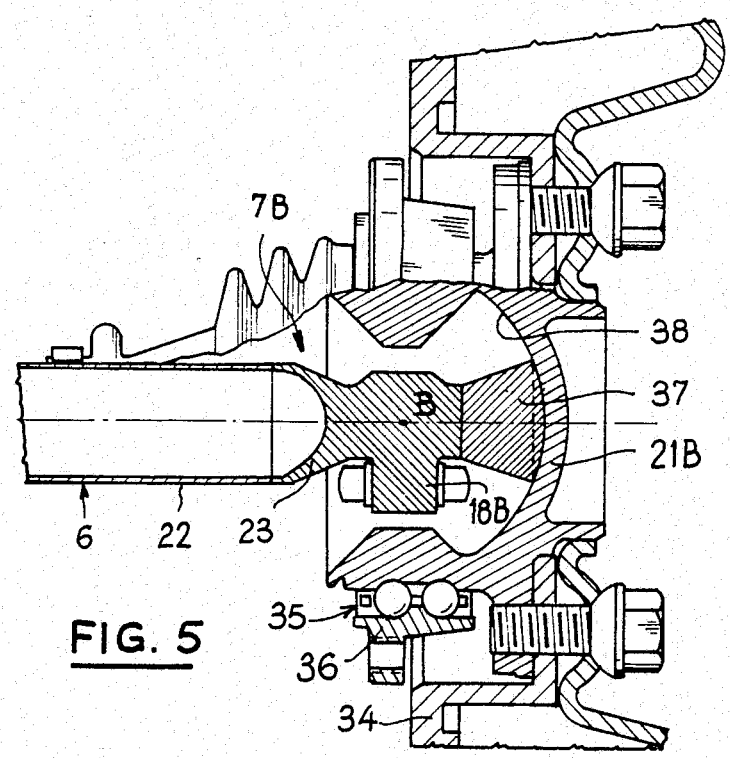
FIG. 5 is a view partly in section of another modification.

FIG. 5 shows another wheel assembly to which the invention is applicable. A single element 21B forms the bowl or tulip element of the fixed tripod wheel joint 7B whose tripod element 18B is in one piece with the corresponding end member 23, a wheel hub carrying a wheel flange 34 and the inner race of a ball bearing 35 whose outer race 36 is secured to the pivot 10. A mass 37, which is suitable for satisfying the aforementioned relations (1) or (2) under the conditions indicated above with respect to FIG. 2 and 3, is fixed to the end of the shaft 6 in overhanging relation to the articulation point B of the joint. As illustrated, this mass may have a spherical end surface and act as a ball joint support means for the tripod element against the spherical end portion 38 of the tulip element, with if required interposition of an anti-friction layer.

The transmission according to the invention achieves improved break in the radial vibrations when the joints 5 and 7 are regions of less friction. Thus, under high torque, the modification shown in FIG. 3, whose two constant-speed joints are of a type having a minimum of internal friction, is much more satisfactory than that shown in FIG. 2 and has been found to give excellent results.

Having now described my invention what I claim as new and desire to secure by Letters Patent is:

1. A motor vehicle transmission comprising:
   a driving shaft;
   a driven shaft;
   a transmission shaft extending between said driving and driven shafts;
   first and second constant-speed joints respectively connecting opposite ends of said transmission shaft to said driving shaft and to said driven shaft; and
   means for preventing radial vibration of said driving shaft from being transmitted to said driven shaft, said means comprising a construction of a unit comprising said transmission shaft and elements of said first and second joints connected to said transmission shaft such that said unit has a moment of inertia, about an axis perpendicular to said transmission shaft and passing through the center of gravity of said unit, substantially equal to the product of the mass of said unit, the distance from the center of articulation of said first joint to said center of gravity, and the distance from the center of articulation of said second joint to said center of gravity.

2. A transmission as claimed in claim 1, wherein at least one of said constant-speed joints includes intermediate elements between an element thereof carried by said transmission shaft and an element thereof carried by the corresponding said driving or driven shaft, and said moment of inertia involves half of the moment which said intermediate elements would have relative to said axis if they were fixed to said transmission shaft.

3. A transmission as claimed in claim 1, wherein, with respect to at least one of said joints, said transmission shaft extends a predetermined length beyond a hub of an element of said one joint which is fixed to the corresponding end of said transmission shaft.

4. A transmission as claimed in claim 1, wherein said transmission shaft comprises a tube and end members, each having a hollow portion adjacent to said tube, fixed to respective ends of said tube.

5. A transmission as claimed in claim 4, wherein said tube is fitted and fixed in cylindrical entrance portions of said hollow portions of said end members.

6. A transmission as claimed in claim 1, wherein at least one of said constant-speed joints comprises a tripod joint and the corresponding end of said transmission shaft carries a mass which is in overhanging relation to said center of articulation of said one joint.

7. A transmission as claimed in claim 6, wherein said tripod joint comprises a wheel joint and said mass is provided in said wheel joint and is applied against an end of a tulip element of said wheel joint.

8. A transmission as claimed in claim 6, wherein both said constant-speed joints comprise tripod joints having tripod elements which are rigid with said transmission shaft and constructed according to the following relation:

$$h \cdot l = \frac{I_G + 3 J \frac{(r)^2}{R}}{m}$$

wherein:
   $I_G$ = the inertia of the assembly comprising said transmission shaft, the tripod element of said joints and rollers of said tripod elements about said axis perpendicular to said transmission shaft and passing through said center of gravity G;
   m = mass of said assembly;
   J = moment of inertia of a roller about its axis of rotation;
   r = distance between the center of a roller and the axis of transmission; and
   R = rolling or spherical radius of said roller.

* * * * *